US010984409B1

(12) United States Patent
Maeng et al.

(10) Patent No.: US 10,984,409 B1
(45) Date of Patent: Apr. 20, 2021

(54) SECURE ELEMENTS FOR MOBILE WALLET APPLICATIONS

(71) Applicant: Wells Fargo Bank, N.A., San Francisco, CA (US)

(72) Inventors: Joon Maeng, Newcastle, WA (US); Thomas Hayes, Katy, TX (US); Ramanathan Ramanathan, Bellevue, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1121 days.

(21) Appl. No.: 15/373,418

(22) Filed: Dec. 8, 2016

(51) Int. Cl.
*G06Q 20/36* (2012.01)
*G06Q 20/32* (2012.01)
*G06Q 20/38* (2012.01)

(52) U.S. Cl.
CPC ......... *G06Q 20/36* (2013.01); *G06Q 20/3223* (2013.01); *G06Q 20/3829* (2013.01); *G06Q 2220/00* (2013.01)

(58) Field of Classification Search
None
See application file for complete search history.

(56) References Cited

U.S. PATENT DOCUMENTS

| 8,583,554 | B2 | 1/2013 | Dooley Maley |
| 8,571,986 | B2 | 10/2013 | Dooley Maley et al. |
| 2012/0197794 | A1 | 8/2012 | Grigg et al. |
| 2014/0136349 | A1* | 5/2014 | Dave ............... G06Q 20/12 705/16 |
| 2015/0254648 | A1* | 9/2015 | Clements ......... G06Q 20/385 705/41 |
| 2015/0278780 | A1 | 10/2015 | Vaidyanathan et al. |

* cited by examiner

*Primary Examiner* — Calvin L Hewitt, II
*Assistant Examiner* — Arastoo (Ari) Shahabi
(74) *Attorney, Agent, or Firm* — Schwegman Lundberg & Woessner, P.A.

(57) ABSTRACT

Various examples described herein are directed to systems and methods for executing a mobile wallet element at a mobile computing device. For example, an executable active element may send a first element message to a mobile wallet application. The first element message may include a subsidiary element request. The mobile wallet application may send to an operating system a request comprising the subsidiary element request. The operating system may send the subsidiary element request to an issuer system. Subsidiary element data describing a subsidiary element may be sent to a second mobile wallet application.

15 Claims, 12 Drawing Sheets

SECURE ELEMENTS FOR MOBILE WALLET APPLICATIONS

TECHNICAL FIELD

Embodiments described herein generally relate to systems and methods for secure communications between mobile wallet applications executing at mobile computing devices and, optionally, between one or more mobile wallet applications and a mobile wallet management system.

BACKGROUND

Mobile wallet applications can allow consumers to make payments for products and services using mobile computing devices instead of cash, credit card accounts, check card, or checks.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
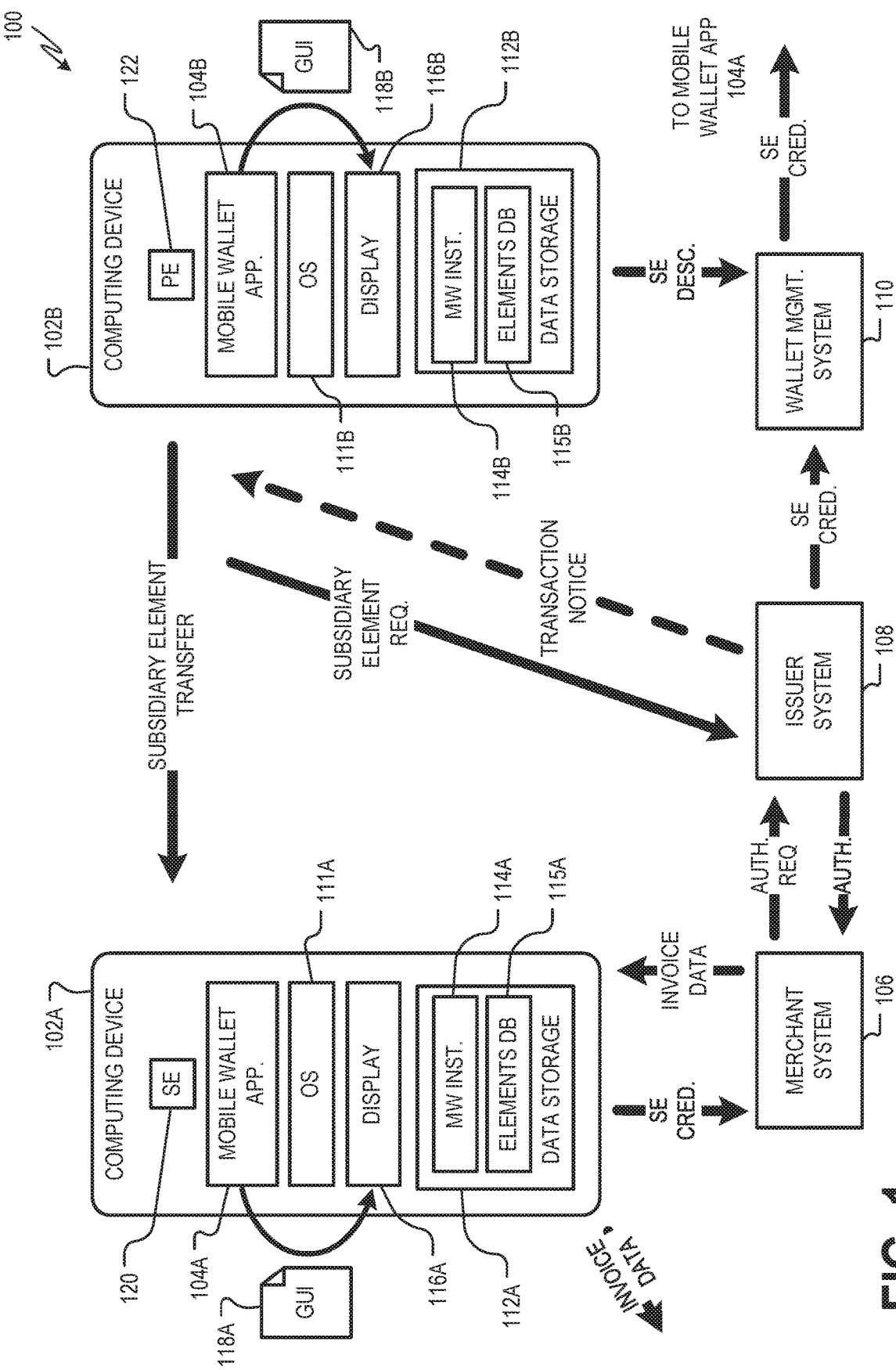
FIG. 1 is a diagram showing one example of an environment for utilizing secure mobile wallet elements.

A user may utilize a mobile wallet application for payment or other transactions. For example, a mobile wallet application may utilize one or more mobile wallet elements (sometimes referred to herein as elements). An element may include executable or non-executable data that is associated with an account, membership, etc. A payment element may be and/or reference a financial account that may be used by the mobile wallet application to make a payment to a payee. For example, a payment element may be or reference a credit card account, a debit account, a checking account, etc. The payee may be a merchant, another mobile wallet application, etc. A non-payment element may be or reference an account that is not used for payments. Example non-payment elements may be or reference an employee card, an insurance card, a driver's license, etc.

Various examples described herein include a mobile wallet application that utilizes executable payment and/or non-payment elements. The mobile wallet application and executable elements may execute at a user computing device of a user. The mobile wallet may provide executable elements with an Application Programming Interface (API). The API may facilitate interactions between elements and the mobile wallet application. For example, the API may define requests that the element may direct to the mobile wallet application. Such requests may include, for example, requests to send a message to an element issuer system to renew the element, create a subsidiary element, confirm a payment made through the element, etc. The API may also define requests that the mobile wallet application may make of the element. Such requests may include, for example, a request to authorize a payment to be made through the element, a request for information about the element, etc. Executable elements, as described herein, may enable element issuers to customize the functionality of mobile wallet elements to provide users with additional features and/or otherwise customize the behavior of elements within a mobile wallet application environment.

In some examples described herein, mobile wallet applications and/or elements may generate and/or utilize subsidiary elements. A subsidiary element depends from a parent element and may be and/or reference the same account as the parent element. Parent and subsidiary elements may be subject to one or more usage rules. Usage rules may include external usage rules and internal usage rules. External usage rules, for example, may described limitations on the use of the parent element. In the context of a parent element that reference a credit card account, example external usage rules may include the credit limit of the account, transaction limits on the account, etc. Internal usage rules may apply to the subsidiary element and may be set, for example, utilizing the parent element as described herein. For example, returning to the credit card account example, a user of the parent element may define an internal usage rule for the subsidiary element that sets a credit limit, transaction limit, etc., for the subsidiary element. In some examples, internal usage rules may be consistent with external usage rules. For example, an internal usage rule credit limit for a credit card account payment element may be less than or equal to the external usage rule credit limit for the credit card account payment element.

Parent and subsidiary elements may be utilized to allow users to quickly and efficiently share a mobile wallet element with other users. For example, in the context of a family with children, an adult may have a credit card account and may wish to allow a child to use the credit card account under some circumstances. The adult may be the user of a first mobile wallet application having a first element associated with the credit card account. The adult may utilize the first mobile wallet application and first element to generate a subsidiary element that is also associated with the credit card account. The subsidiary element may be provided to a second mobile wallet application used by the child. In this way, the child may utilize the subsidiary element to make purchases on the credit card account. In some examples, the adult may set internal usage rules that limit the use of the subsidiary element by the child. Such internal usage rules may include, a maximum amount that the child may charge to the credit card account, a list of approved and/or disapproved merchants where the child may make purchases with the subsidiary element, a maximum purchase size for the subsidiary element, etc.

In various examples described herein, mobile wallet elements may be active or passive. Parent elements (e.g., elements that have subsidiary elements depending therefrom) may be active while subsidiary elements may be active or passive. An active element may become a parent element for a new subsidiary element. For example, a user of a mobile wallet application having an active element may utilize the mobile wallet application and/or the active element to generate a new subsidiary element and distribute the new subsidiary element to another mobile wallet application. A passive element, on the other hand, may be used to fund purchase transactions on the account of its parent element, but may not be enabled to generate additional subsidiary elements from the same parent. In some examples, an active element may be enabled to communicate with an issuer system, for example, to configure a new subsidiary element, renew the account referenced by the active element, renew the active element, itself, etc. On the other hand, a passive element may not be enabled to communicate with the issuer system except through its parent element.

Active and passive elements may be utilized to provide still more functionality and flexibility to mobile wallet application users. For example, a business may have a credit card account that is to be used by all employees for business expenses. A department manager may be the user of a mobile wallet application having an active element. The department manager may provide an active subsidiary element to a first employee who is a middle manager under the department manager. In this way, the first employee may generate additional subsidiary elements for other employees who report to the first employee. The department manager may also provide a passive subsidiary element to a second employee (e.g., an employee who does not have direct reports). In this way, the second employee may utilize the passive subsidiary element to make purchases on the credit card account, but may not create additional subsidiary elements.

Operations described herein for generating and/or utilizing subsidiary elements may be executed by a mobile wallet application, an executable element of the mobile wallet application, or some combination thereof. For example, subsidiary elements may be used in an environment that includes executable elements and/or in an environment that does not include executable elements.

FIG. 1 is a diagram showing one example of an environment 100 for utilizing secure mobile wallet elements. The environment 100 includes user computing devices 102A, 102B executing respective mobile wallet applications 104A, 104B. The environment 100 also includes an example merchant system 106, an example issuer system 108, and an example wallet management system 110.

The user computing devices 102A, 102B may be any computing devices suitable for executing the respective mobile wallet applications 104A, 104B. Example user computing devices 102A, 102B may include smart phones, tablet computers, laptop computers, smart watches, etc. The mobile wallet applications 104A, 104B (sometimes referred to herein as a mobile wallet), may be executed by a processing unit of the user computing devices 102A, 102B. Example mobile wallet applications include, but are not limited to, APPLE PAY®, ANDROID PAY®, GOOGLE WALLET®, CURRENT C® by MCX®, SAMSUNG PAY®, and peer-to-peer payment apps such as VENMO®, SQUARE CASH®, and TILT APP®.

The mobile wallet applications 104A, 104B may be programmed to manage mobile wallet elements, including payment elements and non-payment elements. Payment elements may be and/or reference user accounts that can fund a payment including, for example, credit card accounts, debit accounts, checking accounts, etc. For example, a user may utilize the mobile wallet applications 104A, 104B to make online and/or in-person payments from payment elements. Non-payment elements may be and/or reference, user accounts, memberships, etc. that do not include funds for making a payment. Examples of non-payment elements include employee cards, insurance cards, membership cards, and driver's licenses. For example, the user may utilize the mobile wallet applications 104A, 104B to present non-payment elements, for example, as proof of identity, to receive a service, etc. In the example configuration of FIG. 1, the user computing device 102A executes an example executable subsidiary element 120 that depends from an executable parent element 122 at the user computing device 102B.

The user computing devices 102A, 102B may comprise respective data stores 112A, 112B, which may store data for executing the mobile wallet applications 104A, 104B and/or elements 120, 122 as described herein. For example, the data stores 112A, 112B may store respective mobile wallet instructions 114A, 114B for executing the mobile wallet applications 104A, 104B. Respective processing units of the user computing devices 102A, 102B may execute the respective mobile wallet instructions 114A, 114B to implement the mobile wallet applications 104A, 104B. In some examples, data stores 112A, 112B may also include respective elements databases 115A, 115B, which may include executable code or other data making up elements 120, 122. In addition to or instead of executable code, elements databases 115A, 115B may include, for example, identification data uniquely identifying an element, historical usage data describing past uses of an element by the mobile wallet applications 104A, 104B, usage rule data describing when an element may be used, etc.

The user computing devices 102A, 102B may also comprise respective displays 116A, 116B. The displays 116A, 116B may be or include any suitable type of display including, for example, a liquid crystal display (LCD), an organic light emitting diode (OLED) display, etc. In some examples, the mobile wallet applications 104A, 104B are programmed to generate respective graphical user interfaces (GUIs) 118A, 118B. The GUIs 118A, 118B may be generated by the mobile wallet applications 104A, 104B and displayed at the respective displays 118A, 118B. Users may provide input via the GUIs 118A, 118B using any suitable input device of the user computing devices 102A, 102B. In some examples, the displays 116A, 116B include a touchscreen or other touch-sensitive display allowing a user to provide input to the GUIs 116A, 116B. Also, in some examples, a user may provide input to one or both of the GUIs 118A, 118B using various other input devices of the user computing devices 102A, 102B in addition to or instead of using a touchscreen. Other input devices may include, for example, a mouse, a track ball, etc.

The user computing devices 102A, 102B may also execute respective operating systems 111A, 111B. Operating systems 111A, 111B, as described herein, may provide an abstraction layer between applications executing at the user computing devices 102A, 102B and hardware of the user computing devices 102A, 102B, such as the displays 116A, 116B, data storage 112A, 112B, network adapters, sensors, other I/O devices, etc. For example, the mobile wallet applications 104A, 104B may access the respective displays 116A, 116B to provide the GUIs 118A, 118B via the operating systems 111A, 111B.

The wallet management system 110 may manage the mobile wallet applications 104A, 104B and, in some examples, is implemented by a provider of the mobile wallet (e.g., a mobile wallet provider). In some examples, the mobile wallet provider is a financial institution, software company, or any other organization that provides and maintains the mobile wallet applications 104A, 104B. For example, the GOOGLE WALLET® mobile wallet application may be provided and maintained by Google, Inc. In some examples, the mobile wallet provider and the issuer of elements of the mobile wallet are the same party.

The wallet management system 110 may comprise one or more computing devices, such as servers, configured to operate as described herein. Computing devices making up the wallet management system 110 may be located at a single geographic location and/or may be distributed across multiple geographic locations. In some examples, the wallet management system 110 may be implemented in a "cloud computing" environment or as a "software as a service" (SaaS). For example, at least some of the operations of the wallet management system 110 may be performed by a group of computing devices, with these operations being accessible via a network and/or via one or more appropriate interfaces (e.g., an API). Although one wallet management system 110 is shown in the environment 100, in some examples multiple wallet management systems may be present. In some examples where the mobile wallet applications 104A, 104B have different providers, each provider may have a distinct wallet management system 110.

The issuer system 108 may be associated with an issuer of one or more of the elements 120, 122 and/or an account or accounts associated with elements 120, 122. In some examples, the issuer is a financial institution such as a bank, credit card account company, etc. In some examples, where elements 120, 122 are non-payment elements including membership or other non-payment accounts, the issuer system 108 may be associated with the subject of the membership (e.g., gym, etc.).

The issuer system 108 may comprise one or more computing devices, such as servers, configured to operate as described herein. Computing devices making up the issuer system 108 may be located at a single geographic location and/or may be distributed across multiple geographic locations. In some examples, the issuer system 108 may be implemented in a "cloud computing" environment or as a "software as a service" (SaaS). For example, at least some of the operations of the issuer system 108 may be performed by a group of computing devices, with these operations being accessible via a network and/or via one or more appropriate interfaces (e.g., an API). Although one issuer system 108 is shown in the environment 100, in some examples multiple wallet issuer systems may be present. For example, different elements may be associated with different accounts having different issuers.

The merchant system 106 may be associated with a merchant that may be the payee of a payment made with a payment element of one of the mobile wallet applications 104A, 104B. For example, the merchant system 106 may be or include a Point of Service (POS) device at a bricks-and-mortar store that receives payments for in-person shopping. In some examples, the merchant system 106 may be or include a web server, payment gateway, or other system for receiving payments for online shopping. Also, in some examples utilizing a non-payment element, the merchant system 106 may be a device for verifying a user's membership, subscription, etc., that is indicated by the element.

The merchant system 106 may comprise one or more computing devices, such as servers, configured to operate as described herein. Computing devices making up the merchant system 106 may be located at a single geographic location and/or may be distributed across multiple geographic locations. In some examples, the merchant system 106 may be implemented in a "cloud computing" environment or as a "software as a service" (SaaS). For example, at least some of the operations of the merchant system 106 may be performed by a group of computing devices, with these operations being accessible via a network and/or via one or more appropriate interfaces (e.g., an API). Although one merchant system 106 is shown in the environment, in some examples multiple merchant systems may be present.

FIG. 1 also illustrates a transaction workflow between the mobile wallet applications 104A, 104B to generate the subsidiary element 120 from a parent element 122. For example, the mobile wallet application 104B and/or the parent element 122 may initiate the creation of the subsidiary element 120 that depends from the parent element 122. A user of the mobile wallet application 104B, in some examples, requests the creation of the subsidiary element 120. A request to create a subsidiary element (SUBSIDIARY ELEMENT REQ.) may be directed from the parent element 122 and/or mobile wallet application 104B to the issuer system 108. The parent element 122 and/or mobile wallet application 104B may also provide subsidiary element description data (SE DESC.) to the wallet management system 110. The subsidiary element description data may describe the subsidiary element 120 including, for example, a set of internal usage rules for the subsidiary element 120. The subsidiary element description data may also indicate whether the subsidiary element 120 is to be an active element or a passive element. In some examples, the subsidiary element request sent to the issuer system 108 also includes the subsidiary element description data.

In response to receiving the subsidiary element request, the issuer system 108 may generate a subsidiary element credential (SE CRED.) and send the subsidiary element credential to the wallet management system 110. The subsidiary element credential may be any suitable token or other credential that may be provided by a mobile wallet application, such as the mobile wallet application 104A, to execute a transaction, such as a purchase, using the new subsidiary element 120. The subsidiary element credential data may be multiple-use credential data and/or single-use credential data. The parent element 122 and/or mobile wallet application 104B may additionally generate the subsidiary element 120 and send to the mobile wallet application 104A a subsidiary element transfer message (SUBSIDIARY ELEMENT TRANSFER) including the subsidiary element 120. For example, the subsidiary element transfer message may include, for example, executable instructions for executing the subsidiary element 120, and/or other data describing the subsidiary element 120 such as, for example, identification data uniquely identifying the subsidiary element 120, usage rule data for the subsidiary element 120, etc.

The mobile wallet application 104A may utilize the subsidiary element 120 for a transaction, such as a purchase transaction with the merchant system 106. For example, a user of the user computing device 102A may select an offering of goods or services to purchase, for example, by browsing a web page of the merchant and/or browsing a bricks-and-mortar store of the merchant. The user may select the subsidiary element 120 for completing the purchase. The merchant system 106 may provide the mobile wallet application 104A and/or the subsidiary element 120 with invoice data (INVOICE DATA) describing the proposed purchase. The invoice data may describe, for example, an amount of the purchase, a type of offering involved in the transaction (e.g., type of goods, type of services, etc.) as well as a description of the merchant. The mobile wallet application 104A and/or subsidiary element 120 may provide the invoice data to the wallet management system 110. The wallet management system 110 may determine if the proposed purchase is consistent with internal usage rules for the subsidiary element 120 and/or with external usage rules for the parent element 122.

Provided that the proposed purchase is consistent with the usage rules, the wallet management system 110 may provide the subsidiary element credential to the mobile wallet application 104A and/or subsidiary element 120. The mobile wallet application 104A and/or subsidiary element 120 may provide the received subsidiary element credential to the merchant system 106. The merchant system 106 may send to the issuer system 108 a purchase authorization request (AUTH. REQ.) that includes the subsidiary element credential received from the mobile wallet application 104A and/or subsidiary element 120 as well as a description of the proposed purchase. The issuer system 108 may verify the credential and/or the other aspects of the purchase and, if approved, may send an authorization message (AUTH.) to the merchant system 106. The merchant system 106 may complete the transaction upon receiving the authorization message. Optionally, the issuer system 108 may also send a transaction notice (TRANSACTION NOTICE) to the mobile wallet 104B and/or parent element 122 indicating the transaction.

Figure 2:
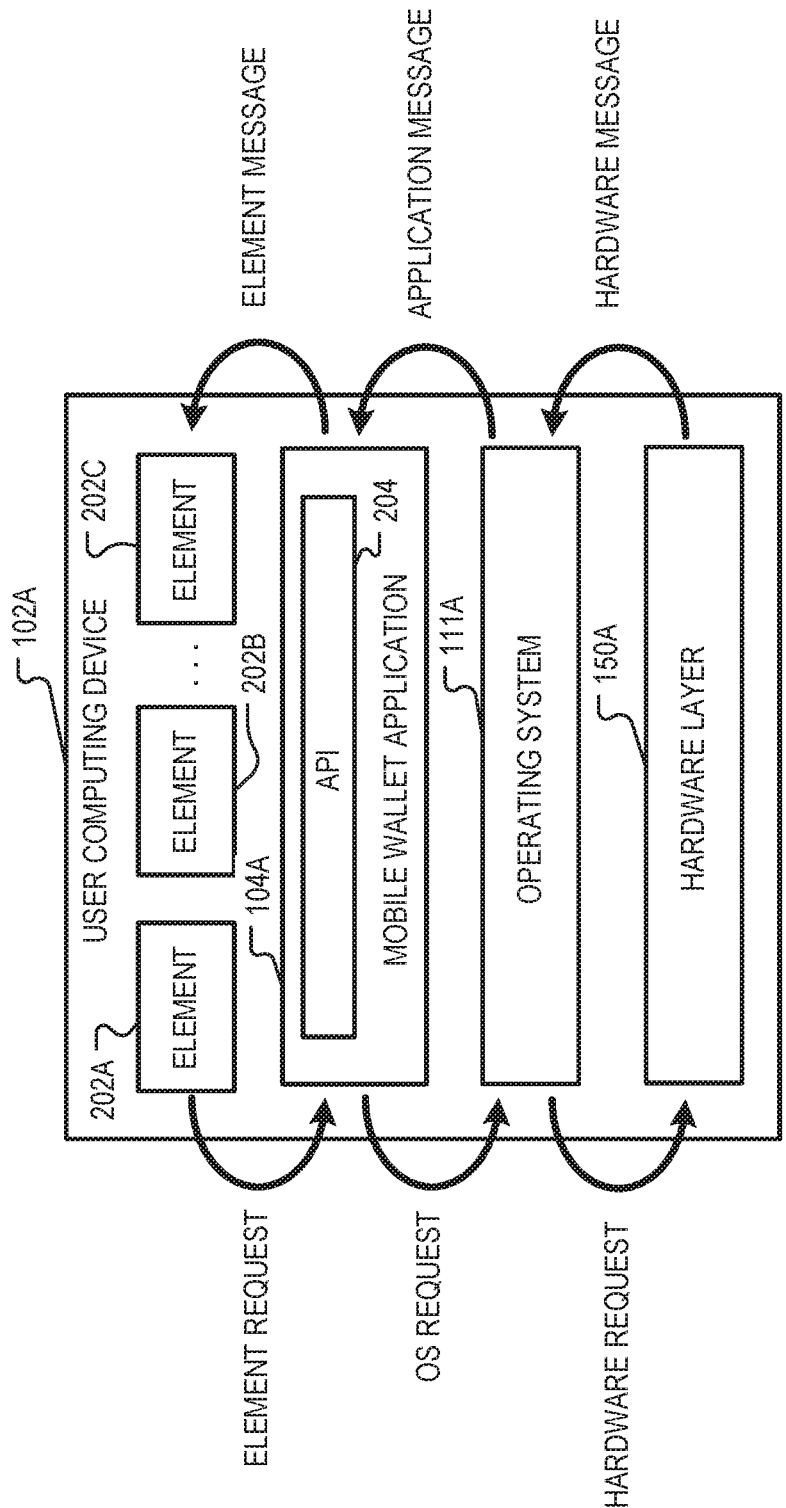
FIG. 2 is a diagram showing additional details of an example of one of the user computing devices of FIG. 1 including executable elements.

FIG. 2 is a diagram showing additional details of an example of the user computing device 102A including executable elements 202A, 202B, 202C. FIG. 2 also shows a hardware layer 150A of the user computing device 102A. The hardware layer 150A may include various hardware elements of the user computing device 102A such as, for example, the data store 112A, memory, a processor unit, I/O devices such as the display 116A, network adapters, etc.

Executable elements 202A, 202B, 202C may be optionally executed at the user computing device 102A. Also, in some examples, the subsidiary element 120 may be an executable element that executes in a manner similar to the executable elements 202A, 202B, 202C. Executable elements 202A, 202B, 202C may be parent elements and/or subsidiary elements. Also, executable elements 202A, 202B, 202C may be active or passive elements.

In the example shown in FIG. 2, the mobile wallet application 104A includes an Application Programming Interface (API) 204. The API 204 may provide a standardized set of messages that may be sent from and/or to the executable elements 202A, 202B, 202C. For example, an executable element 202A may send an element request (ELEMENT REQUEST) to the mobile wallet application 104A. The element request may be formatted according to a syntax recognizable to the API 204. In various examples, the element request may be of a type that is recognized and/or supported by the API 204. In some examples, the element request is a message directed to any suitable recipient such as, for example, the mobile wallet application 104A, a hardware layer 150A of the user computing device 102A, another application executing at the user computing device 102, etc. For example, the element request may be a request to generate a new subsidiary element directed to an issuer system, such as issuer system 108, a wallet management system, such as the wallet management system 110, etc. Also, for example, the element request may be a request to an issuer system, such as the issuer system 108 to renew the element 202A and/or a subsidiary element of the element 202A. Also, in some examples, the element request may be a request to modify the GUI 118A provided to a user of the user computing device 102A. For example, the element 202A may request a modification of the GUI 118A, for example, to prompt a user of the user computing device 102A to provide data regarding a purchase, a subsidiary element to be created, etc.

The element request may be received by the mobile wallet application 104A, for example, via the API 204. The mobile wallet application 104A may generate an OS request (OS REQUEST) directed to the operating system 111A. The OS request may request access to the hardware layer 150A of the user computing device 102A, for example, to implement the element request. For example, when the element request includes a request to send a message to a recipient, the OS request may include data describing the message and a recipient, such as a Universal Resource Locator (URL) or other address. When the element request includes a modification to the GUI 118A, the OS request may include a description of the requested modification. The OS 111A may receive the OS request and generate a corresponding hardware request (HARDWARE REQUEST) or requests that are provided to the hardware layer 150A. For example, if the element request included a request to send a message to a recipient, the hardware request may include a request directed to a wired or wireless network adapter for transmitting the message. Also, for example, if the element request included a modification to the GUI 118A, the hardware request may comprise an instruction to the display 116A or other I/O device to implement the requested modification.

FIG. 2 also illustrates how messages from the hardware layer can be provided to the example executable element 202C. For example, the hardware layer 150A may generate a hardware message (HARDWARE MESSAGE). The type of the hardware message may depend, for example, on the hardware that generated it. For example, if a network adapter of the user computing device 102A receives an external message from another component of the environment 100 (e.g., another application executing at the user computing device 102A or another device, the issuer system 108, the wallet management system 110, the merchant system 106, etc.), then the hardware message may include the external message. Also, for example, if an input device of the user computing device 102A generates the hardware message, then the hardware message may include data received from the user of the user computing device 102A that is directed to the element 202C. In some examples, the operating system 111A may receive the hardware message and generate an application message (APPLICATION MESSAGE) directed to the mobile wallet application 104A. The application message may include the data received from the hardware message, albeit in a form that is readable to the mobile wallet application 104A. The API 204 may receive the application message and determine whether it includes any data directed to the element 202C. If the application message does include data directed to the element 202C, the API 204 may generate an element message according to the syntax of the API 204 and send the element message (ELEMENTMESSAGE) to the element 202C.

Figure 3:
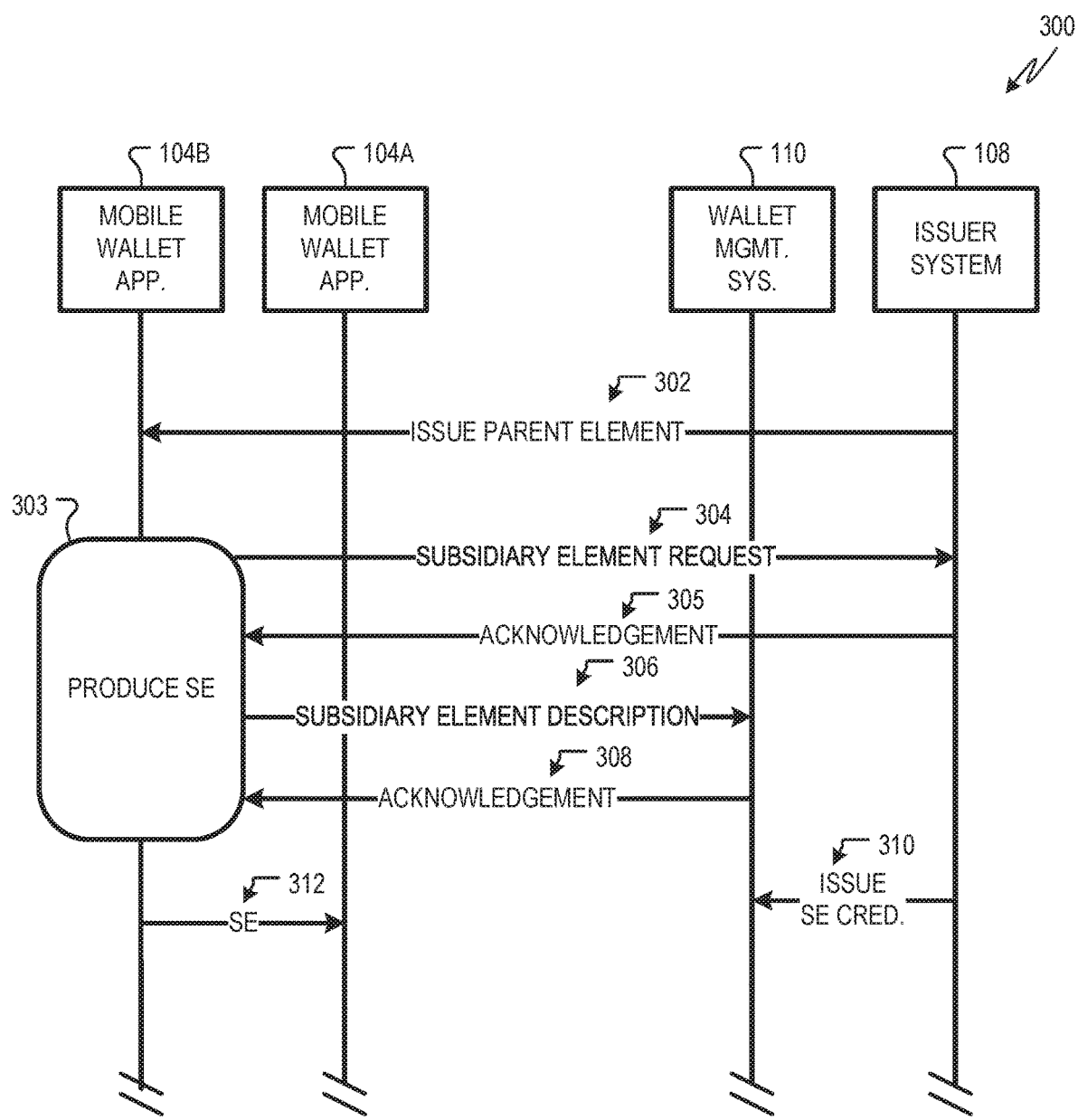
FIG. 3 is a timing diagram showing one example for generating a subsidiary element in the environment of FIG. 1.

FIG. 3 is a timing diagram 300 showing one example for generating a subsidiary element in the environment 100 of FIG. 1. The timing diagram 300 shows operations that may be performed by the mobile wallet application 104B, which generates the subsidiary element, by the mobile wallet application 104A, which receives the subsidiary element, by the wallet management system 110 and by the issuer system 108. In various examples, operations and messages described as being performed, sent, and/or received by the mobile wallet applications 104A, 104B may be performed, sent, and/or received by the respective elements 120, 122 instead. For example, the mobile wallet applications 104A, 104B may provide APIs for the elements 120, 122 as described herein with respect to FIG. 2.

At message 302, the issuer system 108 may issue the parent element 122 to the mobile wallet application 104B. For example, the issuer system 108 may provide the mobile wallet application 104B with executable code for executing the parent element 122 and/or any other suitable data for implementing and/or using the parent element 122. The parent element 122 may be an active element, for example, an active element that is permitted to have subsidiary elements.

At operation 303, the mobile wallet application 104B may produce the subsidiary element 120. Producing the subsidiary element 120 may include generating executable code for executing the subsidiary element 120 at the user computing device 102A, generating other identifying data that indicates the subsidiary element 120, etc. Generating the subsidiary element 120 may also include, for example, prompting a user of the user computing device 102B to provide data regarding the subsidiary element 120 including, for example, whether the subsidiary element 120 is to be active or passive, internal usage rules for the subsidiary element 120, an indication of an entity that is to enforce the internal usage rules, etc.

In some examples, the mobile wallet application 104B may send a subsidiary element request to the issuer system 108 at message 304. The subsidiary element request may include subsidiary element description data describing the subsidiary element 120 including, for example, an indication of the parent element 122, an indication of internal usage rules for the subsidiary element 120, etc. Optionally, the issuer system 108 may provide an acknowledgement message 305 indicating that it has received the subsidiary element description. Optionally, the mobile wallet application 104B may also provide a subsidiary element description message 306 to the wallet management system 110. For example, this may occur when the wallet management system 110 is to enforce one or more internal usage rules for the subsidiary element 120. The wallet management system 110 may provide an acknowledgement message 308.

The issuer system 108 may issue a subsidiary element credential to the wallet management system 110 at message 310. The subsidiary element credential may be provided to the mobile wallet application 104A to enable the mobile wallet application 104A to utilize the subsidiary element 120. For example, the subsidiary element credential may be provided to the mobile wallet application 104A at the time of a purchase or other transaction utilizing subsidiary element 120. Also, the mobile wallet application 104B may provide the subsidiary element 120 to the mobile wallet application 104A at message 312. Sending the subsidiary element 120 may include, for example, sending subsidiary element data that may include, for example, executable code, a description of the subsidiary element 120 including, an account number associated with the subsidiary element, etc. The subsidiary element 120 may be provided, for example, via secure wallet-to-wallet communication, as described herein. Also, in some examples, sending of the subsidiary element 120 may be initiated by the parent element 122. For example, the parent element 122 may send a subsidiary element transfer request to the mobile wallet application 104B. The subsidiary element transfer request may include subsidiary element data describing the subsidiary element 120, such as, for example, a description of the subsidiary element 120, a description of internal usage rules for the subsidiary element 120, executable code for the subsidiary element 120, etc. The mobile wallet application 104B may send the subsidiary element transfer request to the OS 111B, which may format it for the hardware layer 150B of the user computing device 102B to send to the mobile wallet application 104A.

Figure 4:
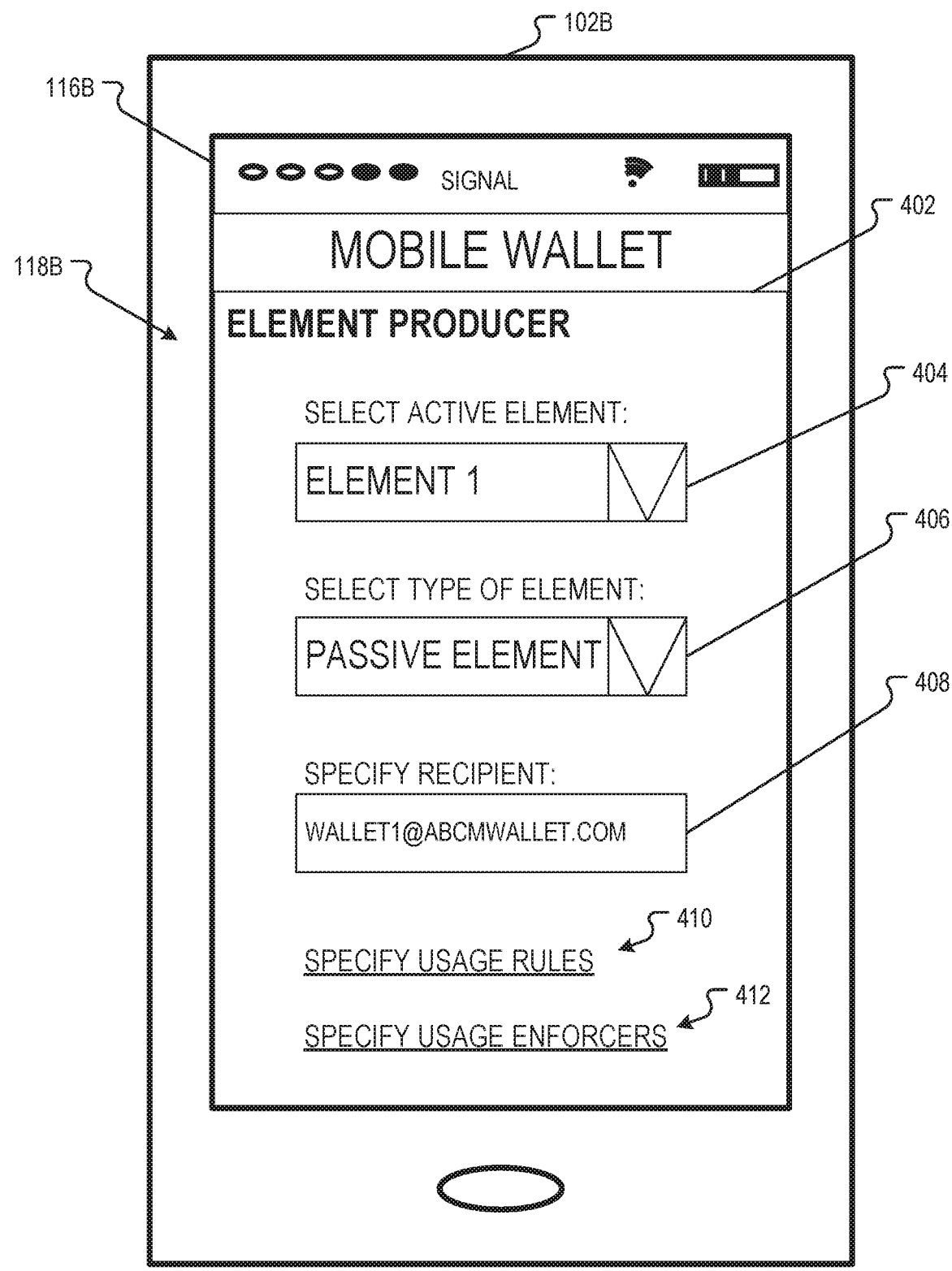
FIG. 4 is a view of the user computing device showing an example of a graphical user interface (GUI) configured to generate the subsidiary element, for example, as described at FIG. 3.

FIG. 4 is a view of the user computing device 102B showing an example of the graphical user interface (GUI) 118B configured to generate the subsidiary element 120, for example, as described at FIG. 3. The GUI 118B is shown to be displayed at the display 116B. In the example shown in FIG. 4, the display 116B is a touchscreen. The GUI 118B comprises an element producer window 402 comprising various input fields 404, 406, 408 for receiving from a user of the user computing device 102B data for generating the subsidiary element 120. For example, an active element selector field 404 may include a drop-down menu or other suitable menu allowing the user to select an active element that will be the parent element 122. For example, although FIG. 1 shows only a single element 122 associated with the mobile wallet application 104B, in some examples, multiple elements may be associated with a mobile wallet application, such as mobile wallet application 104B. The user may be prompted at the active element selector field 404 to select an active element to be the parent element for the newly-created subsidiary element 120.

An element type selector field 406 may include a drop-down menu or other suitable menu allowing the user to select a type for the subsidiary element 120. For example, the subsidiary element 120 may be an active element or a passive element. A recipient-selector field 408 may include a field for receiving address data from the user. The address data may describe a recipient of the subsidiary element 120. For example, the address data may include an e-mail address or other secure address of the mobile wallet application 104A, which receives the subsidiary element 120 in the example of FIG. 1. In some examples, the recipient-selector field 408 may receive an address configured for secure wallet-to-wallet communication, for example, as described herein with respect to FIGS. 8 and 9.

A usage rules link 410 may be selected by the user to enable the user to user to specify internal usage rules for the subsidiary element 120. For example, selecting the link 410 may cause the mobile wallet application 104B and/or parent element 122 to modify the GUI 118B to include fields for receiving internal usage rules for the subsidiary element 120. Similarly, a usage enforcer link 412 may be selected to receive enforcer data from the user. Enforcer data may specify an entity that will enforce the internal usage rules. For example, the issuer system 108 may enforce external usage rules, such as credit limits, etc., of the account that is or is associated with the parent element 122 and subsidiary element 120. Internal usage rules for the subsidiary element 120 may be enforced by any suitable entity including, for example, the mobile wallet application 104B, the wallet management system 110, the issuer system 108, etc.

Figure 5:
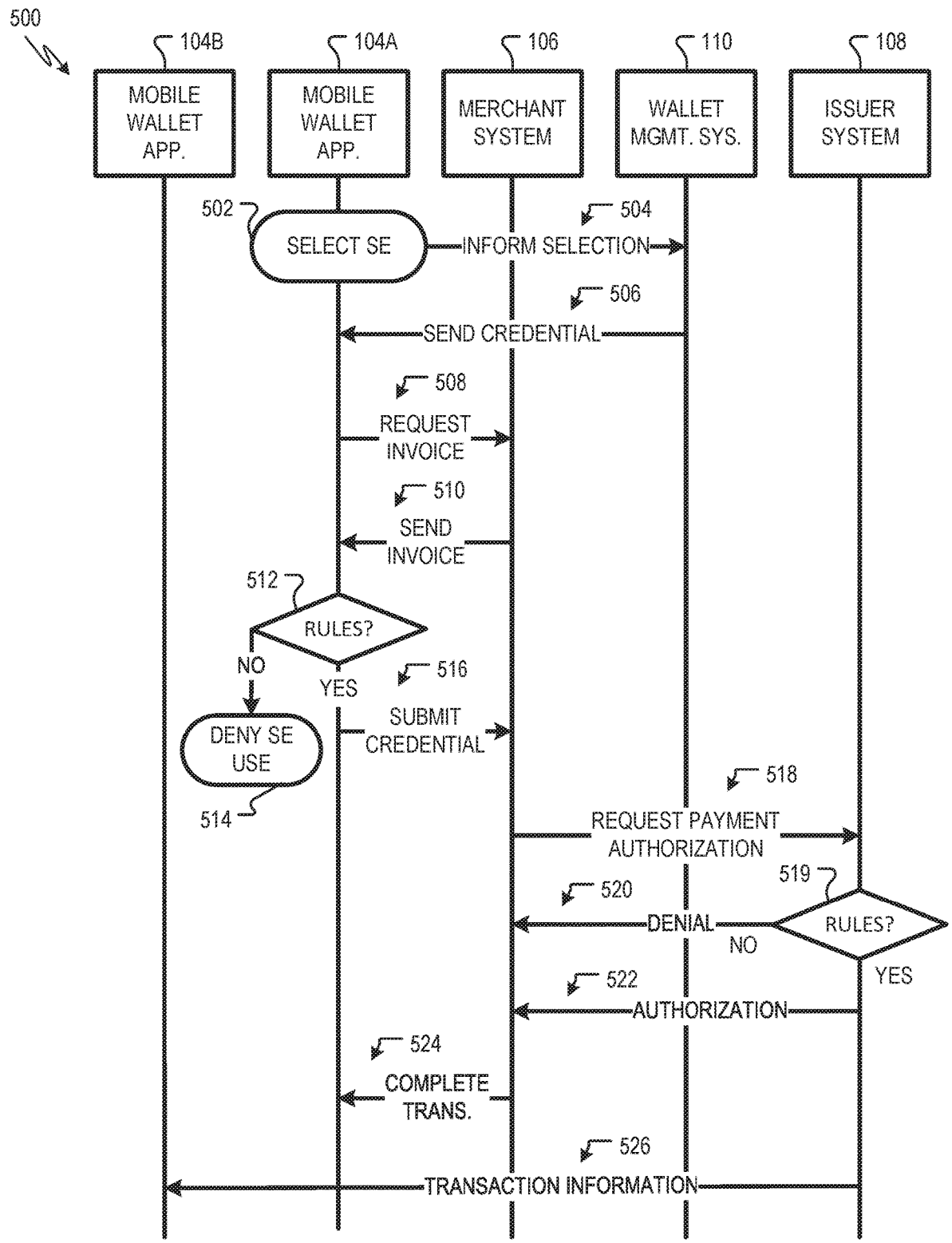
FIG. 5 is a timing diagram showing one example for using the subsidiary element where internal usage rules are enforced by the issuer system of FIG. 1.

FIG. 5 is a timing diagram 500 showing one example for using the subsidiary element 120 where internal usage rules are enforced by the issuer system 108. The timing diagram 500 shows operations that may be performed by the mobile wallet applications 104A, 104B, the merchant system 106, the wallet management system 110, and the issuer system 108. In various examples, operations and messages described as being performed, sent, and/or received by the mobile wallet applications 104A, 104B may be performed, sent, and/or received by the respective elements 120, 122 instead. For example, the mobile wallet applications 104A, 104B may provide APIs for the elements 120, 122 as described herein with respect to FIG. 2.

At operation 502, the mobile wallet application 104A may select the subsidiary element 120 for making a payment. For example, the mobile wallet application 104A may receive element selection data from a user of the user computing device 102A (e.g., via the GUI 118A). The payment may be made, for example, to a merchant represented in FIG. 5 by the merchant system 106. At message 504, the mobile wallet application 104A may inform the wallet management system 110 that it will use the subsidiary element 120 for the purchase. In response, at message 506, the wallet management system 110 may provide the credential data for the subsidiary element 120 to the mobile wallet application 104A. As described herein, the credential data may be single-use credential data usable only for a single payment and/or multi-use credential data usable for multiple transactions. At message 508, the mobile wallet application 104A may request invoice data from the merchant system 106, which may provide the invoice data at message 510. The invoice data may describe the requested payment including, for example, the terms of sale. For example, when the payment is for the purchase of a good or service, the invoice data may describe the good or service purchased, the price of the good or service, etc.

At operation 512, the mobile wallet application 104A (and/or subsidiary element 120) may determine if the payment indicated by the invoice data complies with internal usage rules for the subsidiary element 120 and/or external usage rules for the account associated with the subsidiary element 120. Operation 512 may serve as a check on the internal and/or external usage rules that may be performed by the mobile wallet application 104A (and/or subsidiary element 120) before the mobile wallet application 104A attempts to use the subsidiary element 120 for the payment. In some examples, operation 512 may be omitted. If the payment does not comply with internal or external usage rules, the mobile wallet application 104A may deny use of the subsidiary element 120 for the payment at operation 514. If the payment does comply with the internal and/or external rules, the mobile wallet application 104A may submit the credential data to the merchant system 106 at message 516.

The merchant system 106, at message 518, may request authorization for the payment from the issuer system 108. The message 518 may include data describing the payment such as, for example, all or part of the description included with the invoice data. The issuer system 108 may, at operation 519, determine if the payment complies with internal and/or external usage rules for the subsidiary element 120. If the payment does not comply with internal and/or external usage rules, the issuer system 108 may send a denial of the payment authorization at message 520. If the payment does comply with internal and/or external usage rules, the issuer system 108 may send an authorization at message 522. The merchant system and mobile wallet application 104A may complete the payment at message 524. For example, the merchant system 106 may indicate to the mobile wallet application 104A that the payment can be completed. At message 526, the issuer system 108 may, optionally, inform the mobile wallet application 104B associated with the parent element 122 (and/or the parent element 122 itself) of the completed payment.

Although FIG. 5 shows a payment transaction, in examples where the subsidiary element 120 is a non-payment element, a similar process may be utilized for a non-payment transaction. Example non-payment transactions include, transactions to access subscription material, transactions to enter a gym or other member facility having an account associated with the subsidiary element 120, etc.

Figure 6:
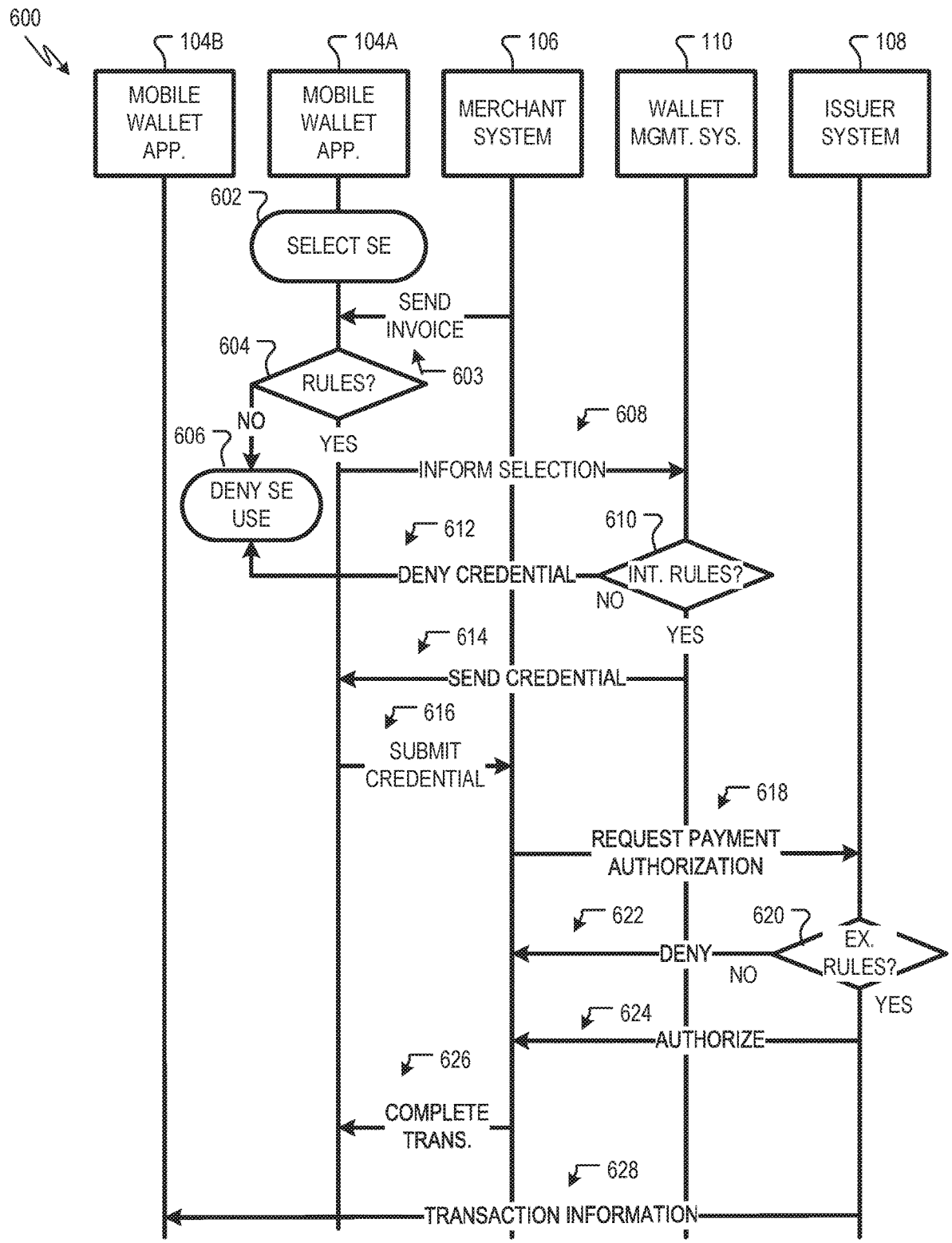
FIG. 6 is a timing diagram showing one example for using the subsidiary element where internal usage rules are enforced by the wallet management system.

FIG. 6 is a timing diagram 600 showing one example for using the subsidiary element 120 where internal usage rules are enforced by the wallet management system 110. The timing diagram 600 shows operations that may be performed by the mobile wallet applications 104A, 104B, the merchant system 106, the wallet management system 110, and the issuer system 108. In various examples, operations and messages described as being performed, sent, and/or received by the mobile wallet applications 104A, 104B may be performed, sent, and/or received by the respective elements 120, 122 instead. For example, the mobile wallet applications 104A, 104B may provide APIs for the elements 120, 122 as described herein with respect to FIG. 2.

At operation 602, the mobile wallet application 104A may select the subsidiary element 120 for making a payment. At message 603, the merchant system 106 may provide invoice data. In some examples, the mobile wallet application 104A may request the invoice data as described at FIG. 5. The invoice data may describe the requested payment. For example, when the payment is for the purchase of a good or service, the invoice data may describe the good or service purchased, the price of the good or service, etc.

At operation 604, the mobile wallet application 104A (and/or subsidiary element 120) may determine if the payment indicated by the invoice data complies with internal usage rules for the subsidiary element 120 and/or external usage rules for the account associated with the subsidiary element 120. Operation 604 may serve as a check on the internal and/or external usage rules that may be performed by the mobile wallet application 104A (and/or subsidiary element 120) before the mobile wallet application 104A attempts to use the subsidiary element 120 for the payment. In some examples, operation 604 may be omitted. If the payment does not comply with internal or external usage rules, the mobile wallet application 104A may deny use of the subsidiary element 120 for the payment at operation 606.

If the payment does comply with the internal and/or external rules, the mobile wallet application 104A may inform the wallet management system 110 of the selection of the secondary element 120 for the payment at message 608. Message 608, in some examples, may include payment data describing the payment, for example, including some or all of the invoice data received from the merchant system 106. The wallet management system 110, at operation 610, may determine if the proposed payment complies with internal usage rules for the subsidiary element 120. For example, the wallet management system 110 may have received the internal usage rules at the time that the subsidiary element 120 was generated, as described herein. If the purchase fails to comply with internal usage rules, then at message 612 the wallet management system 110 may deny the credential to the mobile wallet application 104A, which may deny use of the subsidiary element 120 for the payment at operation 606. If the purchase does comply with the internal usage rules for the subsidiary element 120, the wallet management system 110 may send the credential data to the mobile wallet application at message 614. The mobile wallet application 104A may provide the credential data to the merchant system 106 at message 616.

The merchant system 106, at message 618, may request authorization for the payment from the issuer system 108. The message 618 may include data describing the payment such as, for example, all or part of the description included with the invoice data. The issuer system 108 may, at operation 620, determine if the payment complies with external usage rules for the subsidiary element 120. The external usage rules, for example, may be the rules that govern the account (e.g., credit card account, debit card account, etc.) that is associated with the parent element 122 and the subsidiary element 120. If the payment does not comply with the external usage rules, the issuer system 108 may send a denial of the payment authorization at message 622. If the payment does comply with internal and/or external usage rules, the issuer system 108 may apply internal and/or external usage rules, the issuer system 108 may send an authorization at message 624. The merchant system 106 and mobile wallet application 104A may complete the payment at message 626. For example, the merchant system 106 may indicate to the mobile wallet application 104A that the payment can be completed. At message 628, the issuer system 108 may, optionally, inform the mobile wallet application 104B associated with the parent element 122 (and/or the parent element 122 itself) of the completed payment.

Figure 7:
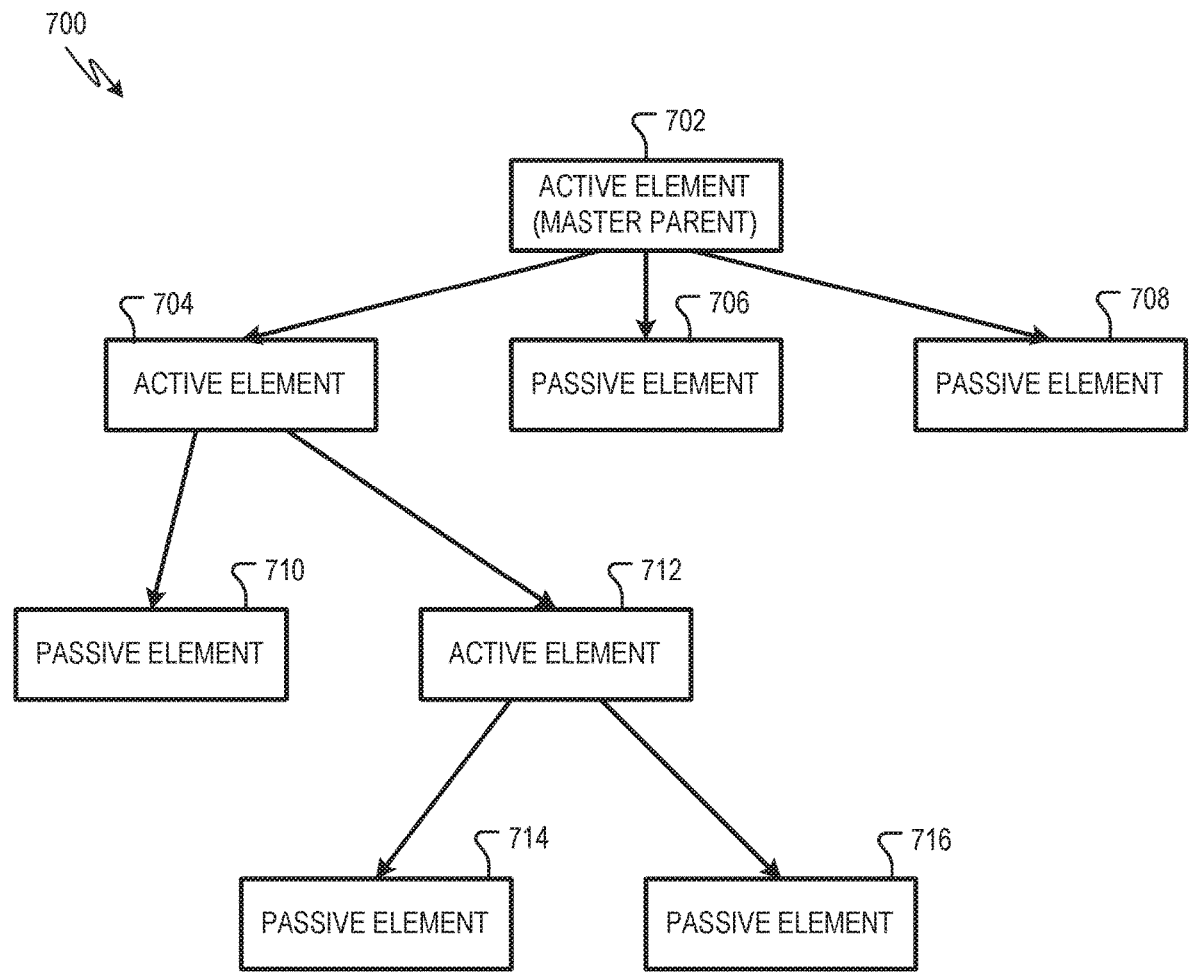
FIG. 7 is a diagram showing relationships among example active and passive elements.

FIG. 7 is a diagram 700 showing relationships among example active and passive elements. The elements 702, 704, 706, 708, 710, 712, 714, 716 of FIG. 7 may be distributed across multiple mobile wallet applications. An active element 702 may be a master parent element. For example, an issuer system, such as the issuer system 108, may issue the active element 702 to a first mobile wallet application. The element 702 may be or reference an account, as described herein. Because all of the other elements 704, 706, 708, 710, 712, 714, 716 are direct or indirect subsidiaries of the element 702, all of the elements 704, 706, 708, 710, 712, 714, 716, may reference the same account as the element 702.

The example of FIG. 7 shows three direct subsidiary elements 704, 706, 708 that depend from the element 702 including an active element 704 and two passive elements 706, 708. In some examples, the passive elements 706, 708 may not be configured not to communicate with the issuer system 108 and may not be configured to generate subsidiary elements. For example, in FIG. 7, passive elements 706, 708 do not have any subsidiary elements. Active element 704 may have its own subsidiary elements 710 and 712. For example, the active element 704 may be a subsidiary element with respect to the element 702 and a parent element with respect to the elements 710 and 710. Element 710 is passive and, therefore, has no subsidiary elements. Active element 712 has two subsidiary passive elements 714, 716. Although not shown in FIG. 7, in some examples, an active element, such as 702, 704, and 712 need not have any subsidiary elements. Also, in some examples, an active element, such as 702, 704 and/or 712 may have more than one active subsidiary element. Additional configurations of subsidiary elements may also be used.

Figure 8:
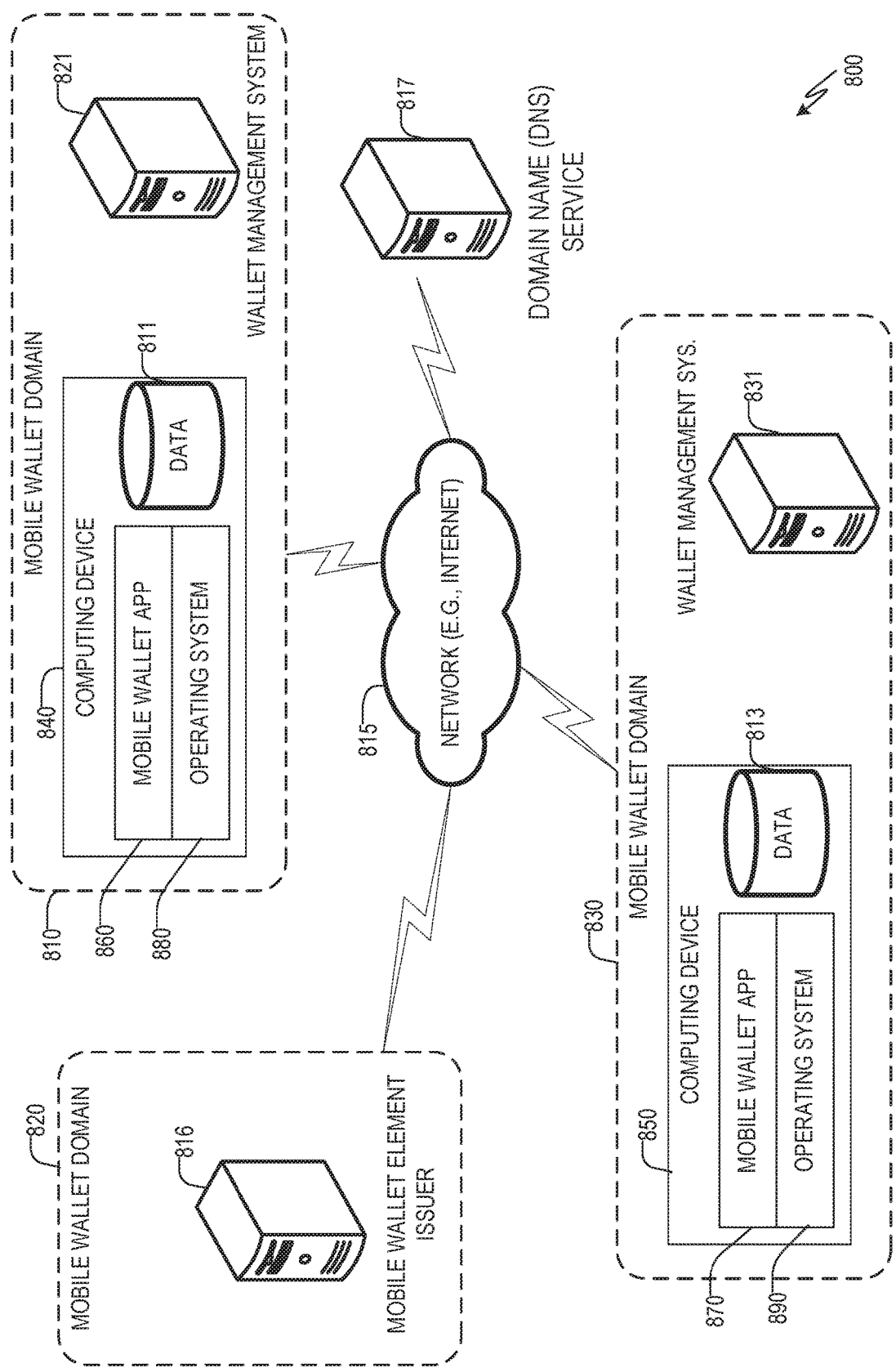
FIG. 8 is a diagram showing one example of an environment for secure digital communication between mobile wallet applications.

FIG. 8 is a diagram showing one example of an environment 800 for secure digital communication between mobile wallet applications (e.g., secure wallet-to-wallet communication). The components and techniques described with respect to FIG. 8 may be utilized in any of the methods and systems described herein including, for example, by the mobile wallet application 104B and/or parent element 122 to send the subsidiary element 120 to the mobile wallet application 104A. In the example environment 800, three mobile wallet domains 810, 820, and 830 are shown. Mobile wallet domains 810 and 830 include two respective user computing devices 840 and 850 with mobile wallet applications 860 and 870 executing along with operating systems 880 and 890 respectively. Mobile wallet domains 810, 820, 830 may be provided by one or more mobile wallet providers (e.g., mobile wallet providers implementing the respective mobile wallet management systems 821, 831. Mobile wallet providers may administer one or more mobile wallet domains. The mobile wallet applications 860 and 870 may originate from the mobile wallet management systems 821 and 831 respectively.

Mobile wallet applications 860 and 870 store one or more data structures that store digital representations of payment and non-payment elements of the user. A digital representation may include one or more information fields stored by the mobile wallet application and providing information about the user (e.g., account number, user age, user name, and the like) and in some cases verification (e.g., a certificate or other means to assure that the digital representation is authentic). Operating systems 880 and 890 provide services to the mobile wallets (and other applications) on the computing devices 840 and 850 such as scheduling tasks for execution, controlling peripherals, providing an interface to the hardware, managing memory, and the like.

Computing devices 840 and 850 may also contain data storage devices 811 and 813 that may store mobile wallet application data, including mobile wallet messages, encryption keys, address books, data structures storing information about the user of the computing device (such as information on payment and non-payment elements of the mobile wallet application), and the like. Mobile wallet domains 810, and 830 may have mobile wallet management systems 821 and 831 that provide mobile wallet communication services to the mobile wallet applications within their respective mobile wallet domains 810 and 830. Example services include message forwarding, message storage, message encryption, and the like.

Domain Name Service (DNS) 817 translates a domain name (e.g., abc.mwallet) to an Internet Protocol (IP) address that may be utilized to send messages to that mobile wallet domain. Mobile wallet domains 810, 820, 830, and DNS 817 may communicate over computer network 815, which in some examples may be or include the Internet. Mobile wallet domain 820 may include mobile wallet element issuer 816. Mobile wallet element issuer 816 may contain applications which may communicate with mobile wallet applications in other mobile wallet domains according to the present disclosure. Example mobile wallet issuers include banks, merchants, government organizations, corporations, or the like.

Figure 9:
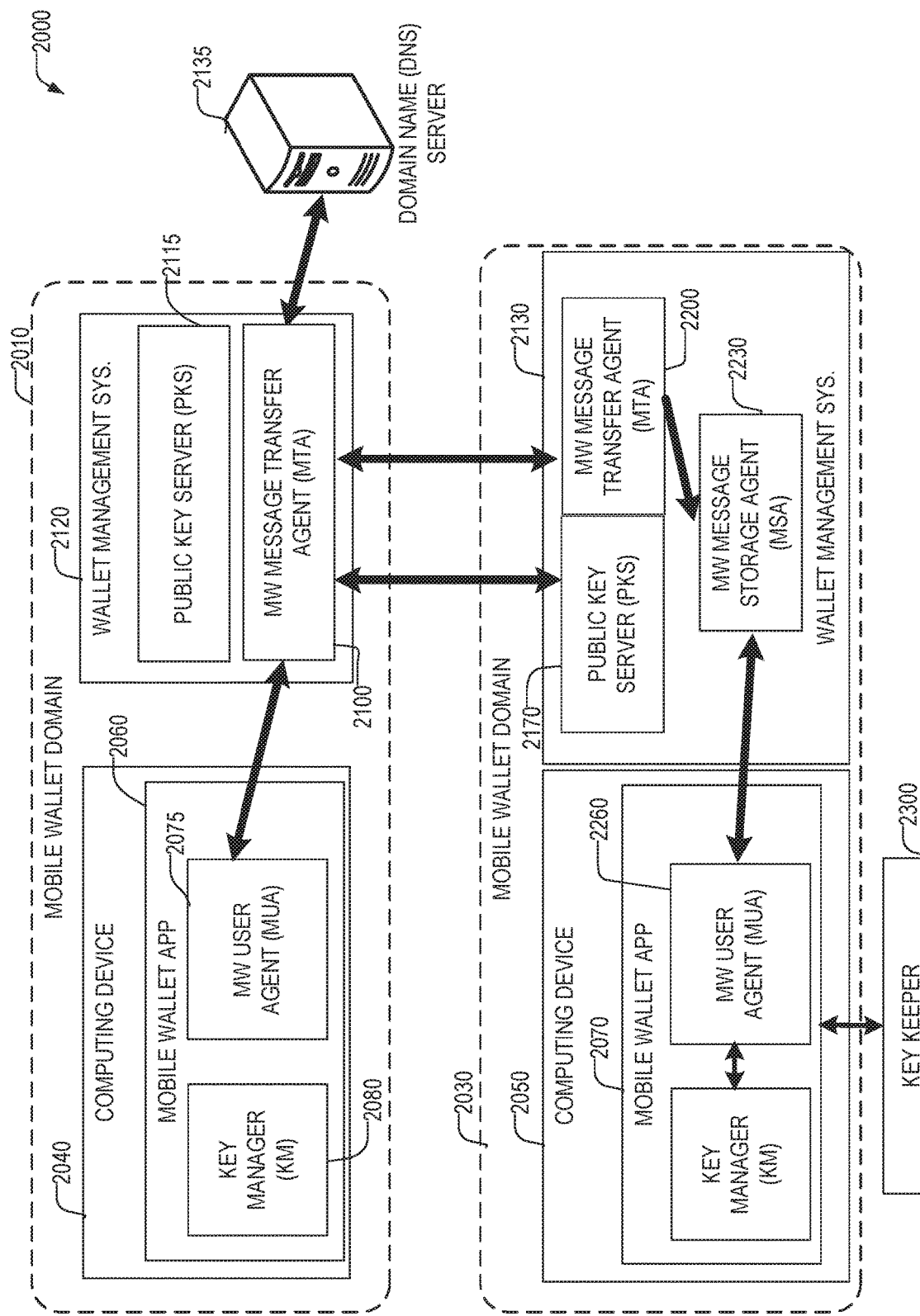
FIG. 9 is a diagram showing one example of a mobile wallet application to mobile wallet application secure digital communication.

Mobile wallet element issuer 816 may issue one or more identification cards, credit card accounts, bank cards, bank accounts, or the like to one or more users of mobile wallet applications (e.g., mobile wallet applications 860 and 870). Mobile wallet element issuer 816 may include one or more of the components of mobile wallet management systems 821 and 831 as shown in FIG. 9 (e.g., PKS, MTA, MSA). In some examples, these elements may be issued by sending the digital representations to one or more mobile wallet application recipients. Thus, using the disclosed techniques, it may be possible to automatically provision and populate a mobile wallet application with little consumer effort.

FIG. 9 is a diagram showing one example of a mobile wallet application to mobile wallet application secure digital communication. Mobile wallet domain 2010 may be an example implementation of mobile wallet domain 810 and mobile wallet domain 2030 may be an example implementation of mobile wallet domain 830 of FIG. 8. Similarly, computing device 2040, mobile wallet application 2060 and mobile wallet management system 2120 may be an example implementation of computing device 840, mobile wallet application 860 and mobile wallet management system 821 respectively of FIG. 8 in some examples. Computing device 2050, mobile wallet application 2070 and mobile wallet management system 2130 may be an example implementation of computing device 850, mobile wallet application 870 and mobile wallet management system 831 respectively of FIG. 1 according to some examples.

A first mobile wallet application 2060 executing on a computing device 2040 in a first mobile wallet domain 2010 is sending a message to a second mobile wallet application 2070 executing on a second computing device 2050 in a second mobile wallet domain 2030. Mobile wallet application 2060 may include a mobile wallet user agent (MUA) 2075 and a key manager 2080. The MUA 2075 allows users to compose, send and retrieve mobile wallet (MW) messages. Key manager 2080 may one or more of: create, provision, register, store, and manage one or more cryptographic keys. Key manager 2080 may register (or obtain) a public key with a certificate authority (not shown for clarity) and with a PKS 2115.

A mobile wallet application 2060 may provide one or more graphical user interfaces (GUI)s to allow users to compose and edit one or more mobile wallet messages. Before sending a message, the MUA 2075 requests the recipient's public key from the MTA 2100. The PKS 2115 and MTA 2100 may be provided by the mobile wallet management system 2120 of the mobile wallet domain 2010. The PKS 2115 and MTA 2100 may be provided by the same computing device, or different computing devices. While the PKS 2115 and MTA 2100 are shown as part of the mobile wallet management system 2120, they may be provided by separate entities. The MTA and PKS are accessible to computing device 2040 and other computing devices both within the mobile wallet domain 2010 and other devices within other mobile wallet domains, over one or more networks (not shown for clarity). These networks may include one or more portions of: Local Area Networks (LAN), Wide Area Networks (WAN), Metropolitan Area Networks (MAN), the Internet, cellular networks, and the like.

The MTA 2100 first examines the message to determine which mobile wallet domain the recipient is in. If the mobile wallet domain is mobile wallet domain 2010, the MTA may retrieve the public key from the PKS 2115 of mobile wallet domain 2010. If the mobile wallet domain is in another domain, then the MTA checks its DNS cache to determine if it already knows the IP address of the recipient mobile wallet domain's PKS. If the mobile wallet domain is not in the DNS cache, the MW sends a lookup message to DNS server 2135 using the Domain Name System Protocol. DNS server 2135 responds with an IP address of the mobile wallet domain (or an error). Once the address is determined (either through the cache or the DNS server 2135), the MTA 2100 sends a message to a PKS 2170 asking for the public key of the recipient mobile wallet application (e.g., mobile wallet application 2070). The response includes the recipient's public key. The public key is then passed by the MTA 2100 to the MUA 2075.

In some examples, the public key is passed to the MTA 2100 in the form of a digital certificate issued by a Certificate Authority (CA). A digital certificate typically includes the name and other identification information of the holder, the holder's public key, the name of the CA, a serial number, and a validity period. The information in the digital certificate is signed by the issuing CA using the issuing CA's private key. The signature can be verified using the CA's public key (which is known and may be pre-installed on the computing devices 2040, 2050). This may serve as a means to verify that the public key is owned by the recipient. For example, the PKS 2170 may provide a digital certificate created by a trusted CA for the recipient mobile wallet application 2070 in response to the request for the recipient's public key. MUA 2075 (or MTA 2100) may utilize the CA's public key and decrypt the certificate. The certificate may then be checked to determine that the message was not tampered with, and that the public key therein belongs to the mobile wallet application 2070 (e.g., authentication and verification).

Once the MUA 2075 is satisfied with the public key, the MUA 2075 then encrypts the contents of the message with the received public key and sends it to the MTA 2100. The MTA 2100 determines the IP Address of the recipient mobile wallet domain's MTA 2200. In some examples, the MTA 2100 utilizes the IP Address previously determined from the DNS server (e.g., using the cache) when retrieving the public key of the recipient. For example, the PKS 2170 and MTA 2200 may have the same IP Address, or the IP Address of the MTA 2200 may be derivable from the IP Address of the PKS 2170. In other examples a mobile wallet application in mobile wallet domain 2010 may have previously communicated with a mobile wallet application in mobile wallet domain 2030 (and thus the MTA 2100 still has the IP Address in its cache). In other examples, the MTA 2100 may re-request the IP Address from the DNS server 2135.

The MTA 2100 then sends the message 2190 to the MTA 2200 of the mobile wallet management system 2130 of the recipient mobile wallet domain 2030 using the determined IP address. MTA 2200 may send a response to MTA 2100 (which may be forwarded to MUA—but this message is not shown for clarity). MTA 2200 may then send the message to the mobile wallet message storage agent (MSA) 2230. Note that the mobile wallet management system 2120 may also employ a MSA, but it is not shown for clarity. MSA 2230 may then store the message and alert the MUA 2260 of the recipient mobile wallet application 2070 using a notification. When the MUA is interested in receiving the message, the MUA may request it and the MSA may provide it. The MUA may decrypt the message using its private key. The private key may be maintained in the key manager 2290. Key manager 2290 may communicate with key keeper 2300. Key keeper 2300 may be a remote key storage facility to prevent the loss of the cryptographic keys should the computing device 2050 experience a loss in data. For example, the key manager 2290 may store one or more keys of the mobile wallet application 2070 in the key keeper 2300.

In some examples, the mobile wallet application 2070 may utilize a second cryptographic key to encrypt the private key. The private key may then be stored with the mobile wallet management system 2130 in encrypted form. The second cryptographic key may then be stored with the key keeper 2300 and utilized to decrypt the private key should the computing device 2050 need it. The key keeper 2300 may be under control of the user of computing device 2050. This ensures that the private key is not given to the mobile wallet management system 2130 and thus the user can entrust that no one associated with the mobile wallet management system 2130 can access their messages.

Figure 10:
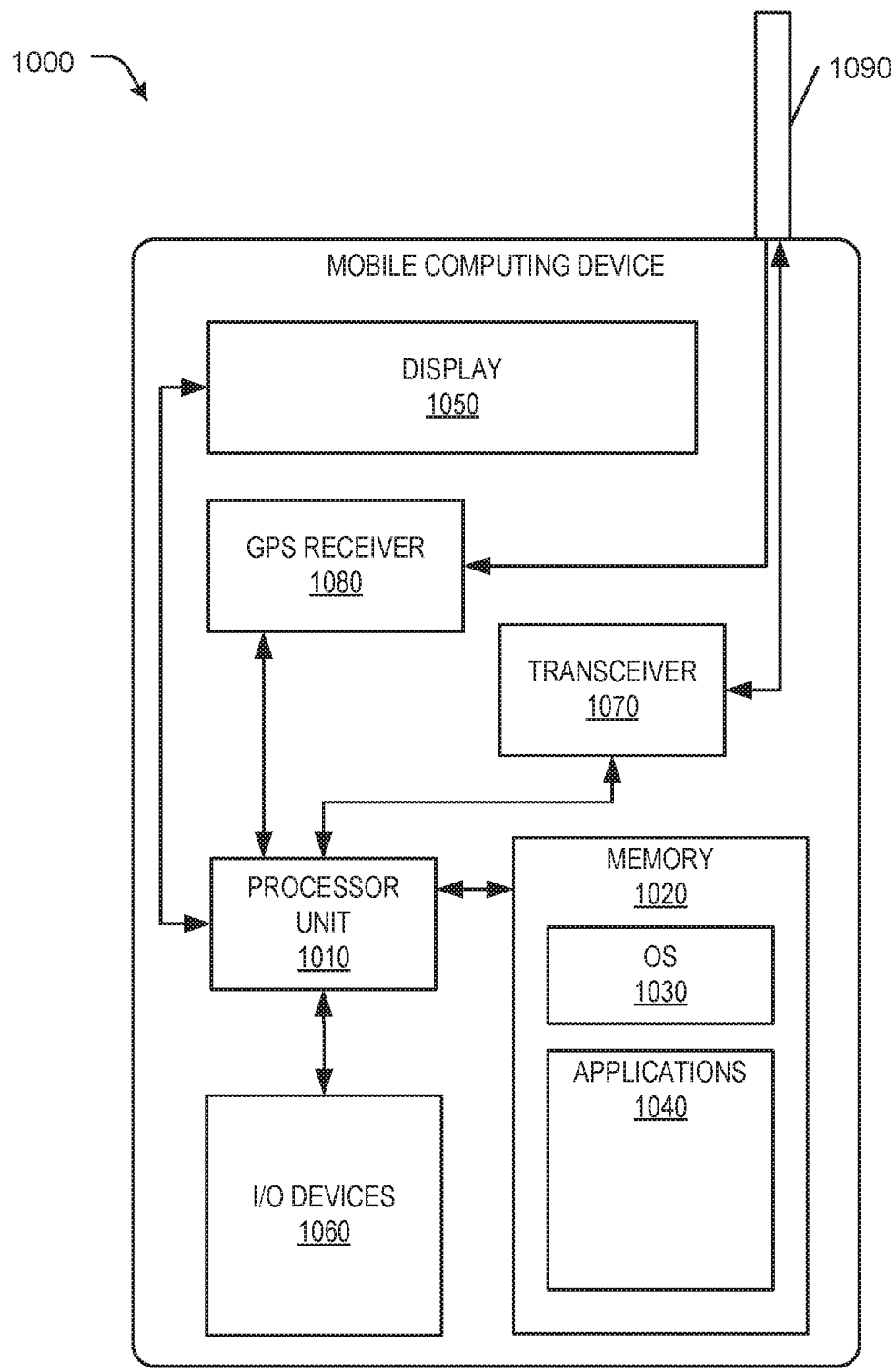
FIG. 10 is a block diagram showing an example architecture of a mobile computing device.

FIG. 10 is a block diagram showing an example architecture 1000 of a mobile computing device. For example, the architecture 1000, for example, may describe any of the computing devices described. The architecture 1000 comprises a processor unit 1014. The processor unit 1014 may include one or more processors. Any of a variety of different types of commercially available processors suitable for mobile computing devices may be used (for example, an XScale architecture microprocessor, a Microprocessor without Interlocked Pipeline Stages (MIPS) architecture processor, or another type of processor). A memory 1020, such as a Random Access Memory (RAM), a Flash memory, or other type of memory or data storage, is typically accessible to the processor. The memory 1020 may be adapted to store an operating system (OS) 1030, as well as application programs 1040. In some examples, the OS may implement software interrupts that cause the architecture 1120 to pause its current task and execute an interrupt service routine (ISR) when an interrupt is received.

The processor unit 1010 may be coupled, either directly or via appropriate intermediary hardware, to a display 1050 and to one or more input/output (I/O) devices 1060, such as a keypad, a touch panel sensor, a microphone, and the like. Such I/O devices 1060 may include a touch sensor for capturing fingerprint data, a camera for capturing one or more images of the user, a retinal scanner, or any other suitable devices. Similarly, in some examples, the processor unit 1010 may be coupled to a transceiver 1070 that interfaces with an antenna 1090. The transceiver 1070 may be configured to both transmit and receive cellular network signals, wireless data signals, or other types of signals via the antenna 1090, depending on the nature of the mobile computing device implemented by the architecture 1100. Although one transceiver 1070 is shown, in some examples, the architecture 1100 includes additional transceivers. For example, a wireless transceiver may be utilized to communicate according to an IEEE 802.11 specification, such as Wi-Fi and/or to a short range communication medium. Some short range communication mediums, such as NFC, may utilize a separate, dedicated transceiver. Further, in some configurations, a GPS receiver 1080 may also make use of the antenna 1090 to receive GPS signals. In addition to or instead of the GPS receiver 1080, any suitable location-determining sensor may be included and/or used including, for example, a Wi-Fi positioning system. In some examples, the architecture (e.g., processor unit 1010) may also support a hardware interrupt. In response to a hardware interrupt, the processor unit 1010 may pause its processing and execute an interrupt service routine (ISR). For example, the alert message 116 may include and/or trigger a hardware interrupt. The ISR for the hardware interrupt may generate the alert, for example, as described herein.

Figure 11:
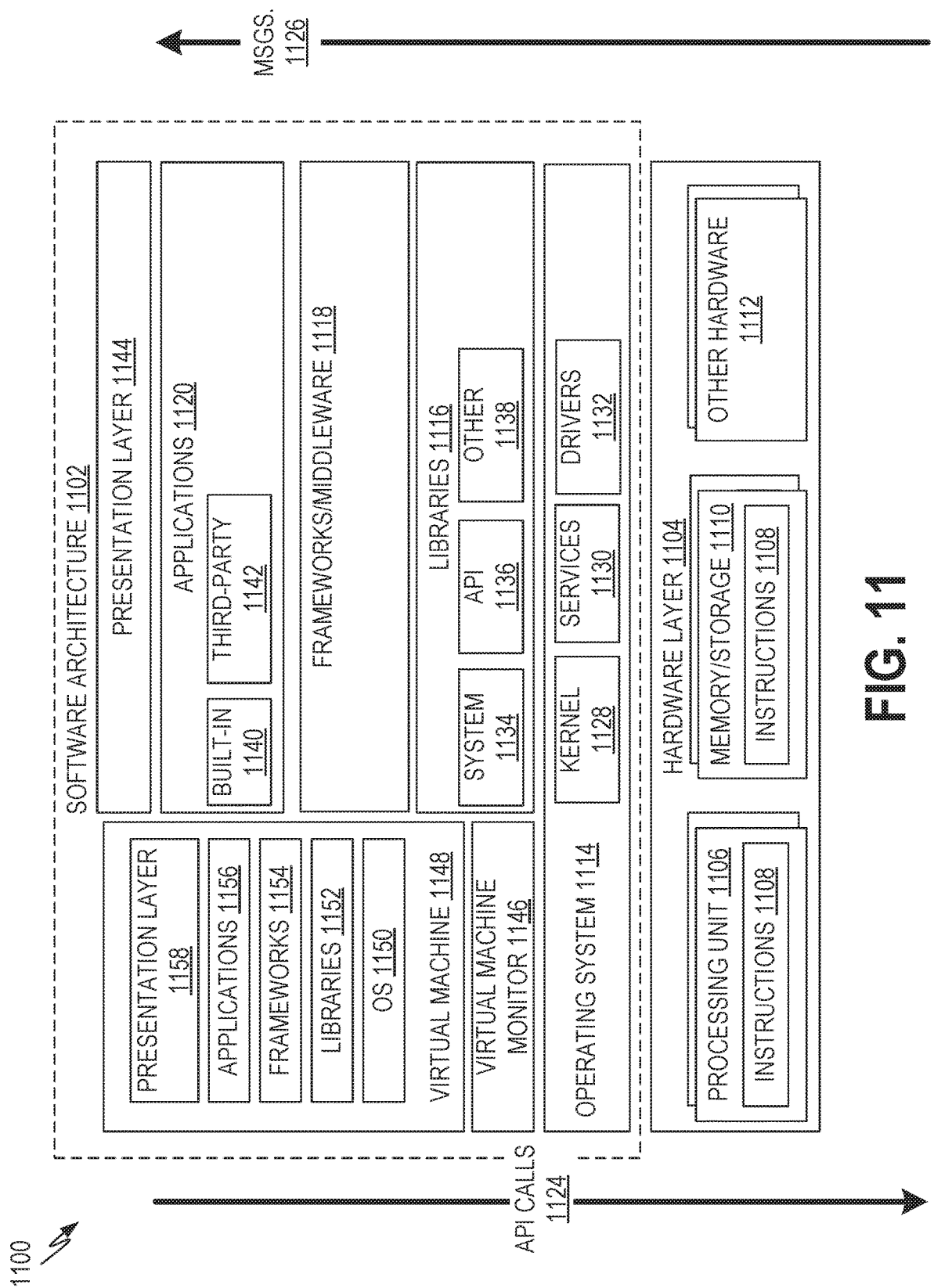
FIG. 11 is a block diagram showing one example of a software architecture for a computing device.

FIG. 11 is a block diagram 1100 showing one example of a software architecture 1102 for a computing device. The architecture 1102 may be used in conjunction with various hardware architectures, for example, as described herein. FIG. 11 is merely a non-limiting example of a software architecture 1102 and many other architectures may be implemented to facilitate the functionality described herein. A representative hardware layer 1104 is illustrated and can represent, for example, any of the above referenced computing devices. In some examples, the hardware layer 1104 may be implemented according to the architecture 1102 of FIG. 11 and/or the architecture 1000 of FIG. 10.

The representative hardware layer 1104 comprises one or more processing units 1106 having associated executable instructions 1108. Executable instructions 1108 represent the executable instructions of the software architecture 1102, including implementation of the methods, modules, components, and so forth of FIGS. 1-8. Hardware layer 1104 also includes memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of hardware architecture 1200.

In the example architecture of FIG. 11, the software 1102 may be conceptualized as a stack of layers where each layer provides particular functionality. For example, the software 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of a hardware or software interrupt and, in response, cause the architecture 1102 to pause its current processing and execute an interrupt service routine (ISR) when an interrupt is received. The ISR may generate the alert, for example, as described herein.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 includes built-in applications 1140 and/or third party applications 1142. Examples of representative built-in applications 1140 may include, but are not limited to, a contacts application, a browser application, a book reader application, a location application, a media application, a messaging application, and/or a game application. Third party applications 1142 may include any of the built in applications as well as a broad assortment of other applications. In a specific example, the third party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 can be the same as corresponding layers previously described or may be different.

Figure 12:
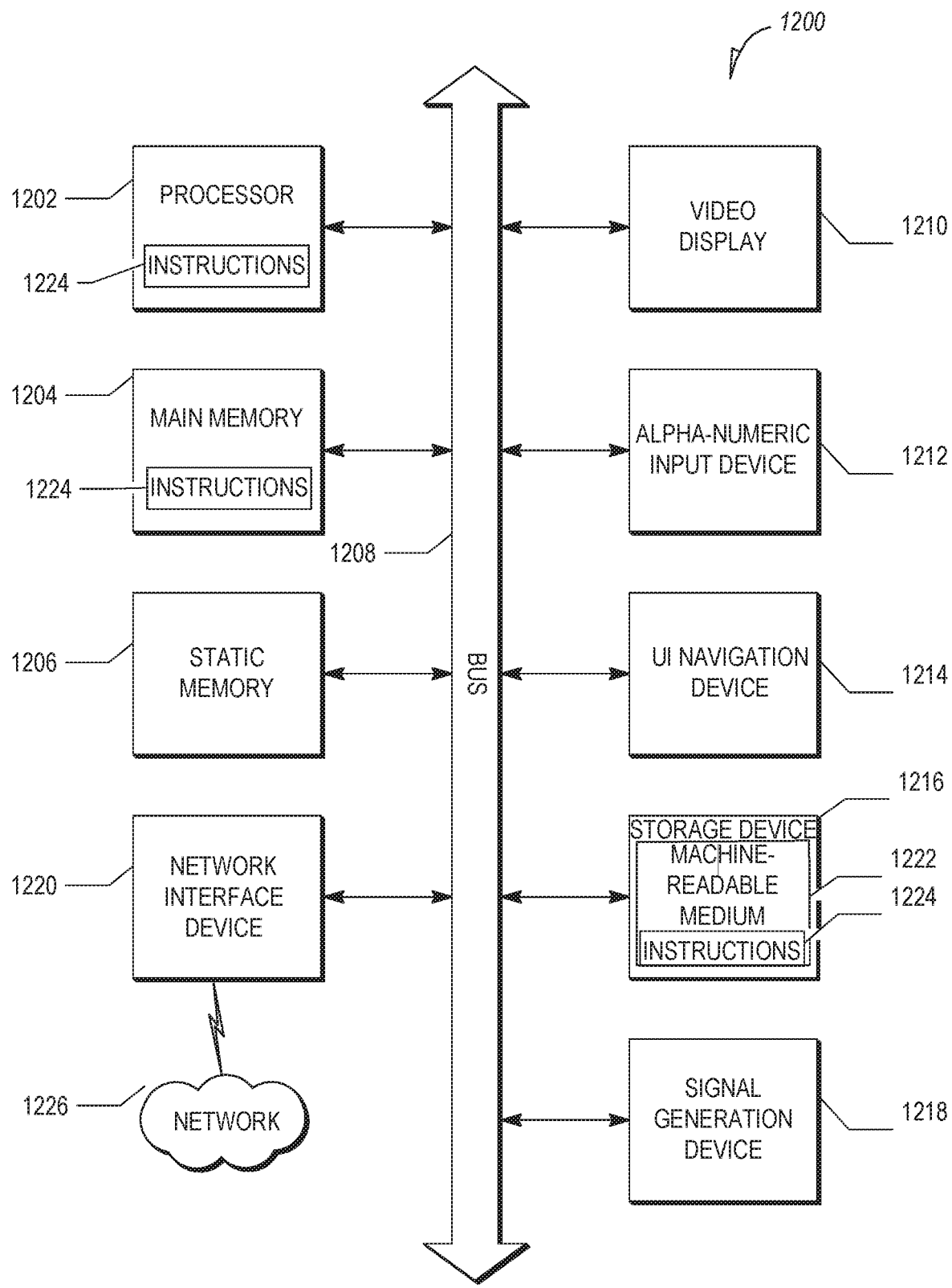
FIG. 12 is a block diagram illustrating a computing device hardware architecture, within which a set or sequence of instructions can be executed to cause the hardware to perform examples of any one of the methodologies discussed herein.

FIG. 12 is a block diagram illustrating a computing device hardware architecture 1200, within which a set or sequence of instructions can be executed to cause the machine to perform examples of any one of the methodologies discussed herein. For example, the architecture 1200 may execute the software architecture 1102 described with respect to FIG. 11. The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 1200 includes a processor unit 1202 comprising at least one processor (e.g., a central processing unit (CPU), a graphics processing unit (GPU) or both, processor cores, compute nodes, etc.). The architecture 1200 may further comprise a main memory 1204 and a static memory 1206, which communicate with each other via a link 1208 (e.g., bus). The architecture 1200 can further include a video display unit 1210, an alphanumeric input device 1212 (e.g., a keyboard), and a user interface (UI) navigation device 1214 (e.g., a mouse). In some examples, the video display unit 1210, input device 1212 and UI navigation device 1214 are incorporated into a touch screen display. The architecture 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, or other sensor.

In some examples, the processor unit 1202 or other suitable hardware component may support a hardware interrupt. In response to a hardware interrupt, the processor unit 1202 may pause its processing and execute an interrupt service routine (ISR), for example, as described herein.

The storage device 1216 includes a machine-readable medium 1222 on which is stored one or more sets of data structures and instructions 1224 (e.g., software) embodying or utilized by any one or more of the methodologies or functions described herein. The instructions 1224 can also reside, completely or at least partially, within the main memory 1204, static memory 1206, and/or within the processor 1202 during execution thereof by the architecture 1200, with the main memory 1204, static memory 1206, and the processor 1202 also constituting machine-readable media. Instructions stored at the machine-readable medium 1222 may include, for example, instructions for implementing the software architecture 1102, instructions for executing any of the features described herein, etc.

While the machine-readable medium 1222 is illustrated in an example to be a single medium, the term "machine-readable medium" can include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 can further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system comprising:
   a first user computing device comprising at least one processor and a memory in communication with the at least one processor, wherein the memory comprises instructions stored thereon that, when executed by the at least one processor, causes the at least one processor to perform operations comprising:
   executing an operating system;
   executing, using the operating system, a first mobile wallet application;
   receiving, via the first mobile wallet application, a first payment element of a user, and storing, via the first mobile wallet application, the received payment element in the memory, wherein the payment element is a financial account and is an executable file;
   executing, via the operating system, the first payment element;
   receiving, via the first mobile wallet application, from the executed first payment element, a request to generate a second payment element;
   displaying, via the first mobile wallet application, a graphical user interface (GUI);
   displaying, via the first mobile wallet application, via the GUI, a plurality of payment elements including the first payment element;
   receiving, via the first mobile wallet application, and from a user, a selection of the displayed first payment element:
   receiving, via the first mobile wallet application, via the GUI, usage rules;
   generating, via the first mobile wallet application, a second payment element using the first payment element and the usage rules;
   receiving, via the first mobile wallet application, and from the user, an address associated with a second mobile wallet application; and
   transmitting, via the first mobile wallet application, the second payment element to the second mobile wallet application using the address.

2. The system of claim 1, the operations further comprising:
   receiving, from a third mobile wallet application a third payment element;
   receiving, via the mobile wallet application, element selection data; and
   sending, to a merchant system, credential data for the third payment element.

3. The system of claim 1, the operations further comprising:
   receiving, from a third mobile wallet application, a third payment element;
   receiving, by the mobile wallet application, element selection data;
   sending, via the mobile wallet application and to the operating system, a request to send the element selection data to a mobile wallet management system; and
   receiving, from the mobile wallet management system, credential data for the third payment element.

4. The system of claim 3, the operations further comprising:
   sending the usage rules to the mobile wallet management system; and before receiving the credential data from the mobile wallet management system, sending to the mobile wallet management system, payment data.

5. The system of claim 1, the operations further comprising:
receiving a third payment element and third payment element usage rules from a third mobile wallet application;
receiving, by the mobile wallet application, element selection data; and
comparing, by the mobile wallet application, the payment with the third payment element usage rules.

6. The system of claim 1, the operations further comprising:
receiving enforcer data; and
sending the usage rules to a mobile wallet management system.

7. The system of claim 1, the operations further comprising generating enforcer data.

8. A method for executing a mobile wallet element at a user computing device, the method comprising:
executing, with the user computing device, an operating system;
executing, with the user computing device, a first mobile wallet application;
receiving, via the first mobile wallet application, a first payment element of a user, and storing, via the first mobile wallet application, the received payment element, wherein the payment element is a financial account and is an executable file;
executing, via the operating system, the first payment element;
receiving, via the first mobile wallet application, from the executed first payment element, a request to generate a second payment element;
displaying, via the first mobile wallet application, a graphical user interface (GUI);
displaying, via the first mobile wallet application, via the GUI, a plurality of payment elements including the first payment element;
receiving, via the first mobile wallet application, and from a user, a selection of the displayed first payment element;
receiving, via the first mobile wallet application, via the GUI, usage rules;
generating, via the first mobile wallet application, a second payment element using the first payment element and the usage rules;
receiving, via the first mobile wallet application, and from the user, an address associated with a second mobile wallet application; and
transmitting, via the first mobile wallet application, the second payment element to the second mobile wallet application using the address.

9. The method of claim 8, further comprising:
receiving, by the user computing device and from a third mobile wallet application a third payment element;
receiving, via the mobile wallet application, element selection data; and
sending, to a merchant system, credential data for the third payment element.

10. The method of claim 8, further comprising:
receiving, by the user computing device and from a third mobile wallet application a third payment element and third payment element usage rules;

receiving, via the mobile wallet application, element selection data;
sending, via the mobile wallet application and to the operating system, a request to send the element selection data to a mobile wallet management system; and
receiving, from the mobile wallet management system, credential data for the third payment element.

11. The method of claim 10, further comprising:
sending, by the user computing device, the usage rules to the mobile wallet management system; and
before receiving the credential data from the mobile wallet management system, sending, by the user computing device and to the mobile wallet management system, payment data.

12. The method of claim 8, further comprising:
receiving, by the user computing device, a third payment element from a third mobile wallet application executing at a third user computing device, third payment element usage rules;
receiving, by the mobile wallet application, element selection data; and
comparing, by the mobile wallet application, the payment with the third payment element usage rule.

13. The method of claim 8, further comprising:
receiving enforcer data; and
sending the usage rules to a mobile wallet management system.

14. The method of claim 8, further comprising generating enforcer data.

15. A non-transitory machine-readable medium comprising instructions thereon that, when executed by at least one processor unit, causes the at least one processor unit to perform operations comprising:
executing an operating system;
executing a first mobile wallet application;
receiving, via the first mobile wallet application, a first payment element of a user, and storing, via the first mobile wallet application, the received payment element, wherein the payment element is a financial account and is an executable file;
executing, via the operating system, the first payment element;
receiving, via the first mobile wallet application, from the executed first payment element, a request to generate a second payment element;
displaying, via the first mobile wallet application, a graphical user interface (GUI);
displaying, via the first mobile wallet application, via the GUI, a plurality of payment elements including the first payment element;
receiving, via the first mobile wallet application, and from a user, a selection of the displayed first payment element;
receiving, via the first mobile wallet application, via the GUI, usage rules;
generating, via the first mobile wallet application, a second payment element using the first payment element and the usage rules,
receiving, via the first mobile wallet application, and from the user, an address associated with a second mobile wallet application; and
transmitting, via the first mobile wallet application, the second payment element to the second mobile wallet application using the address.

* * * * *

UNITED STATES PATENT AND TRADEMARK OFFICE
CERTIFICATE OF CORRECTION

PATENT NO. : 10,984,409 B1
APPLICATION NO. : 15/373418
DATED : April 20, 2021
INVENTOR(S) : Maeng et al.

Page 1 of 1

It is certified that error appears in the above-identified patent and that said Letters Patent is hereby corrected as shown below:

In the Claims

In Column 22, Line 33, in Claim 1, delete "element:" and insert --element;-- therefor In Column 24, Line 23, in Claim 12, delete "rule." and insert --rules.-- therefor In Column 24, Line 58, in Claim 15, delete "rules," and insert --rules;-- therefor Signed and Sealed this
Seventh Day of September, 2021

Drew Hirshfeld
*Performing the Functions and Duties of the
Under Secretary of Commerce for Intellectual Property and
Director of the United States Patent and Trademark Office*